United States Patent
Vierra

(10) Patent No.: US 6,513,286 B2
(45) Date of Patent: Feb. 4, 2003

(54) TOOL FOR HANGING FASCIA BOARD

(76) Inventor: Brian J. Vierra, 270 Waipalani Rd., Haiku, HI (US) 96708

( * ) Notice: Subject to any disclaimer, the term of this patent is extended or adjusted under 35 U.S.C. 154(b) by 0 days.

(21) Appl. No.: 09/851,341

(22) Filed: May 9, 2001

(65) Prior Publication Data

US 2002/0184835 A1 Dec. 12, 2002

(51) Int. Cl.$^7$ ................................................. E04B 1/18
(52) U.S. Cl. .................. 52/127.3; 52/127.5; 52/127.2; 33/406; 33/495; 33/533; 33/573; 33/838; 248/215; 269/41; 269/904; 403/232.1
(58) Field of Search .......................... 52/702, 712, 713, 52/715, 93.2, 93.1, 94, 126.7, 127.3, 127.2, 127.5; 269/3, 41, 45, 904; 403/232.1; 248/215; 33/406, 495, 533, 573, 838

(56) References Cited

U.S. PATENT DOCUMENTS

| | | |
|---|---|---|
| 2,689,101 A | 9/1954 | Dygert |
| 2,985,417 A | 5/1961 | Thompson |
| 3,500,604 A | 3/1970 | Vandall |
| 3,815,862 A * | 6/1974 | Williams ...................... 249/40 |
| 4,261,155 A * | 4/1981 | Gilb ............................. 52/702 |
| 4,340,100 A * | 7/1982 | Anderson, II ............... 145/1 R |
| 4,709,527 A | 12/1987 | Cooley |
| 4,836,517 A | 6/1989 | Vossler |
| 4,843,726 A | 7/1989 | Ward |
| 4,947,616 A | 8/1990 | Sorton |
| 5,054,755 A * | 10/1991 | Hawkes .......................... 269/3 |
| 5,192,059 A | 3/1993 | Silver |
| 5,228,667 A * | 7/1993 | Bridegum .................... 269/45 |
| 5,341,619 A * | 8/1994 | Dunagan et al. .............. 52/702 |
| 5,380,116 A * | 1/1995 | Colonias ................... 403/232.1 |
| 5,546,726 A | 8/1996 | Stalzer |
| 5,603,580 A * | 2/1997 | Leek et al. .............. 403/232.1 |
| 5,611,189 A | 3/1997 | Fleck |
| 5,746,421 A * | 5/1998 | Bowerman .................... 269/41 |
| 5,768,830 A | 6/1998 | Kelly |
| 6,076,325 A * | 6/2000 | Sluiter ........................ 52/655.1 |
| 6,240,702 B1 * | 6/2001 | Wilson ........................ 52/749.1 |

* cited by examiner

*Primary Examiner*—Yvonne M. Horton
(74) *Attorney, Agent, or Firm*—H. Jay Spiegel

(57) ABSTRACT

A tool for hanging fascia board includes three parts. A first part consists of a t-bar having two pieces attached perpendicularly together and designed to be removably mounted on the end of a rafter board with the flat elongated member lying against a side wall of the rafter and with a portion of the second perpendicular member overlying the top of the rafter and removably affixed to it through the use of nails driven through openings in the second perpendicular member. A support hanger is pivotably mounted to the t-bar and has a slot sized and configured to slidably receive a fascia board. A depth adjuster is mounted on the support hanger and may be reciprocated and fixed in a desired position to adjust the depth of the slot of the support hanger. Thus, the depth of the slot may be adjusted to facilitate attachment of fascia boards of varying dimensions such as, for example, 2×4, 2×6, 2×8, 2×10, and 2×12. In a preferred method of use of the present invention, a plurality of tools in accordance with the teachings of the present invention may be used together with each such tool being mounted on a particular rafter board end so that a fascia board can be supported between two tools so that the fascia board is properly aligned and in position to be nailed to the rafter board ends.

17 Claims, 2 Drawing Sheets

TOOL FOR HANGING FASCIA BOARD

BACKGROUND OF THE INVENTION

The present invention relates to a tool for hanging fascia board. In the prior art, carpentry tools are known and are devised to make easier many tasks. Among those tasks is the hanging of fascia board on the ends of rafters. Such a task is often difficult to achieve by one person since the person must balance themself on a high ladder, support the fascia board, and nail it into place. Often, the carpenter wishes that he or she has three or four hands to accomplish this task.

In the prior art, Applicant is aware of devices specifically devised to assist the carpenter in hanging fascia board on the ends of rafters. U.S. Pat. No. 4,836,517 to Vossler teaches a fascia board installing apparatus including a clamp to clamp the device on a rafter and a support for the fascia board. The present invention differs from the teachings of Vossler as contemplating angular adjustment between the fascia board support and the portion attached to the rafter and as allowing adjustment to compensate for fascia board having differing dimensions.

U.S. Pat. No. 5,192,059 to Silver discloses a fascia board holder including a channel section mountable on a roof rafter and a pivotably mounted quadrant lockable at any selected angle with a perpendicular channel to receive the fascia board. The present invention differs from the teachings of Silver in several respects including (1) the present invention may be adjusted to accommodate to fascia boards of differing dimensions, and (2) the present invention includes a fascia board support laterally spaced from the end of the rafter.

U.S. Pat. No. 5,611,189 to Fleck discloses an apparatus for hanging fascia board including a saddle or bracket attached to the upper edge of the rafter and a fascia board catch pivotably attached to the saddle through an adjusting bar. The present invention differs from the teachings of Fleck as contemplating use with fascia boards of differing dimensions and lateral spacing of the fascia board support from the rafter on which it is mounted.

U.S. Pat. No. 4,709,527 to Cooley discloses a device for hanging sheetrock from the ceiling inside of a building. There is no teaching or suggestion in Cooley of hanging fascia board on the ends of rafters.

Additionally, Applicant is aware of the following U.S. Patents that teach carpentry tools only generally related to the teachings of the present invention:

| | |
|---|---|
| 2,689,101 to Dygert | 4,947,616 to Sorton |
| 2,985,417 to Thompson | 5,546,726 to Stalzer |
| 3,500,604 to Vandall | 5,768,830 to Kelly. |
| 4,843,726 to Ward | |

None of these references teaches a device designed to facilitate easy installation of fascia board on the ends of rafters in the manner taught by Applicant herein.

SUMMARY OF THE INVENTION

The present invention relates to a tool for hanging fascia board. The present invention includes the following interrelated objects, aspects and features:

(1) In a first aspect, the preferred embodiment of the present invention includes three parts which are adjustable with respect to one another for any situation that might be encountered by a carpenter in hanging fascia board.

(2) A first part of the present invention consists of an elongated bar or a t-bar having two pieces attached perpendicularly together including a flat elongated base member having an opening therethrough comprising a hand grip and a second perpendicular lip member or cross member, also flat, straddling a top surface of the base member and having a plurality of holes therethrough. The t-bar is designed to be removably mounted on the end of a rafter with the flat elongated member lying against a side wall of the rafter, and with a portion of the second perpendicular member overlying the top of the rafter and removably affixed thereto through the use of nails, such as duplex nails, driven through openings in the second perpendicular member.

(3) A support hanger is pivotably mounted to the t-bar and may be fixed in any desired angular relationship with respect to the t-bar, for example, angles ranging from 0° to 45°, although this range is merely exemplary. The support hanger has a slot therethrough sized and configured to slidably receive a fascia board.

(4) Depth adjustment means comprising a depth adjuster is mounted on the support hanger and may be reciprocated and fixed in a desired position to adjust the depth of the slot of the support hanger. Thus, the depth of the slot may be adjusted to facilitate attachment of fascia boards of varying dimensions such as, for example, 2×4, 2×6, 2×8, 2×10, and 2×12, which are examples of the dimensions of fascia boards that may suitably be fastened to the ends of rafter boards using the present invention.

(5) In a preferred method of use of the present invention, a plurality of tools in accordance with the teachings of the present invention may be used together with each such tool being mounted on a particular rafter board end so that a fascia board can be supported between two tools so that the fascia board is properly aligned and in position to be nailed to the rafter board ends.

(6) As the present invention is designed, the support hanger pivots laterally of the rafter board to which the t-bar is removably mounted. In this way, the carpenter can drive nails through the fascia board and into the end of the rafter board to which the inventive tool is temporarily affixed. This is a distinct advantage over tools previously designed as described in the BACKGROUND OF THE INVENTION section hereinabove since several of those tools include structure such as a fascia board support hanger that overlies the end of the rafter board to which it is attached, thereby preventing the carpenter from nailing the fascia board to that particular rafter end until such time as the tool in question is removed therefrom.

(7) In one preferred mode of use of the present invention, the nails used to temporarily affix the t-bar to a rafter board are of the duplex type having double heads to facilitate easy removal thereof after the fascia board has been nailed to the rafter ends.

As such, it is a first object of the present invention to provide a tool for hanging fascia board.

It is a further object of the present invention to provide such a tool permitting the hanging of fascia boards of diverse dimensions.

It is a still further object of the present invention to provide such a tool including means for allowing angular adjustment between a t-bar and a support hanger to render the tool versatile for rafters having diverse angular relationships with the associated framing of the building on which they are mounted.

It is a yet further object of the present invention to provide such a tool wherein a plurality of such tools may be used in tandem to better facilitate simple hanging of fascia boards on rafter ends.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 4:
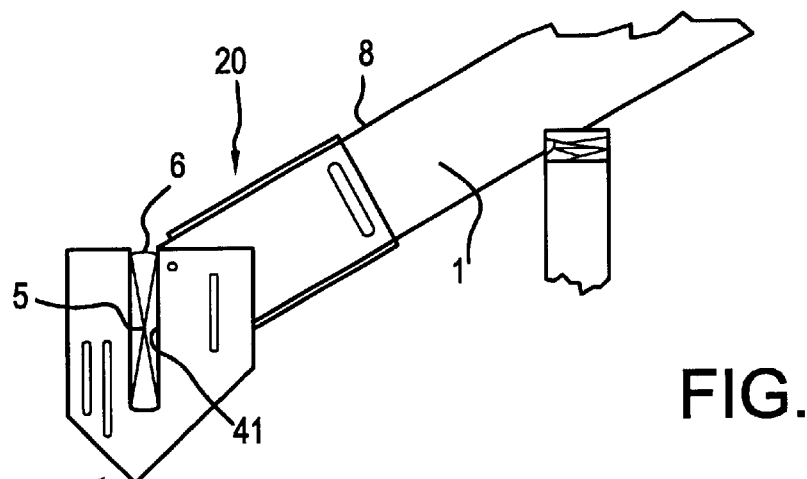
FIG. 4 shows a side view of a rafter board having the inventive tool mounted thereon.
Figure 5:
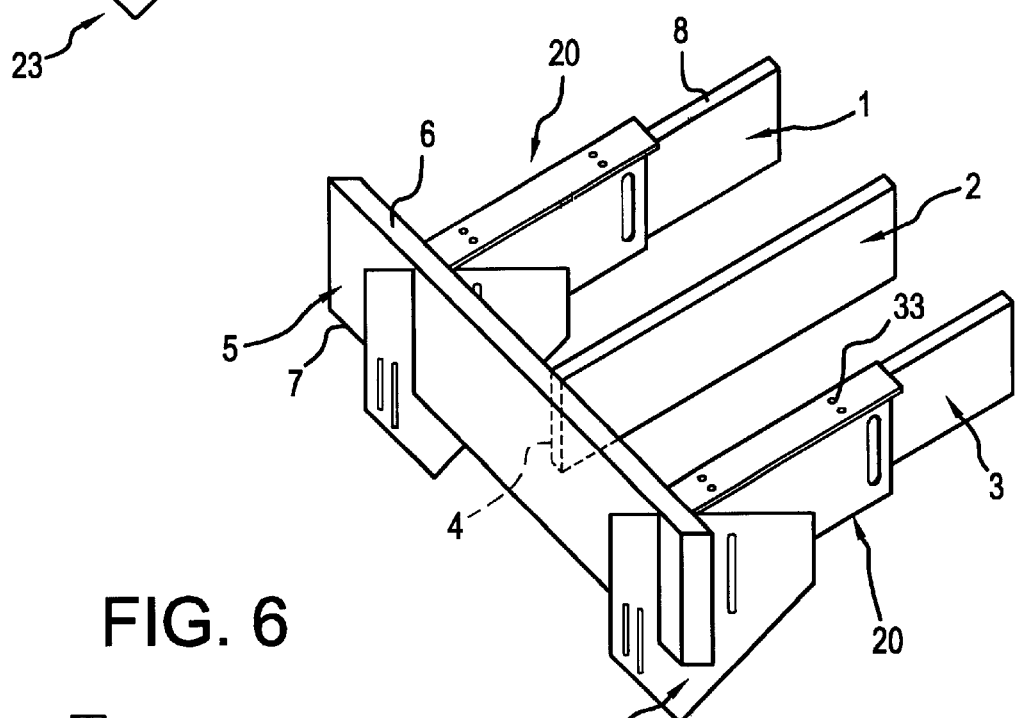
FIG. 5 shows a perspective view of a plurality of rafter boards with two tools in accordance with the teachings of the present invention temporarily mounted on two respective rafter boards to support a fascia board in preparation for nailing it in place.

Reference is first made to FIGS. 4 and 5. With reference to FIG. 5, a plurality of rafter boards 1, 2 and 3 are depicted as they would be assembled within a building (not shown). The rafter boards 1, 2 and 3 include ends of which the end 4 of the rafter board 2 is shown in phantom and wherein the end 4 is typical of the ends of the rafter boards 1, 2 and 3.

FIG. 5 shows a fascia board 5 having a top surface 6 and a bottom surface 7. FIG. 4 shows the rafter 1 with its top surface 8 and makes clear that the top surface 6 of the fascia board 5 is intended to be approximately even with the location of the top surface 8 of the rafter board 1 and, of course, the corresponding top surfaces of the rafter boards 2 and 3.

The present invention is generally designated by the reference numeral 20 and in FIG. 5, two tools 20 are shown mounted to respective rafter boards 1 and 3. One of the tools 20 is also seen in FIG. 4 mounted to the rafter board 1.

Figure 1:
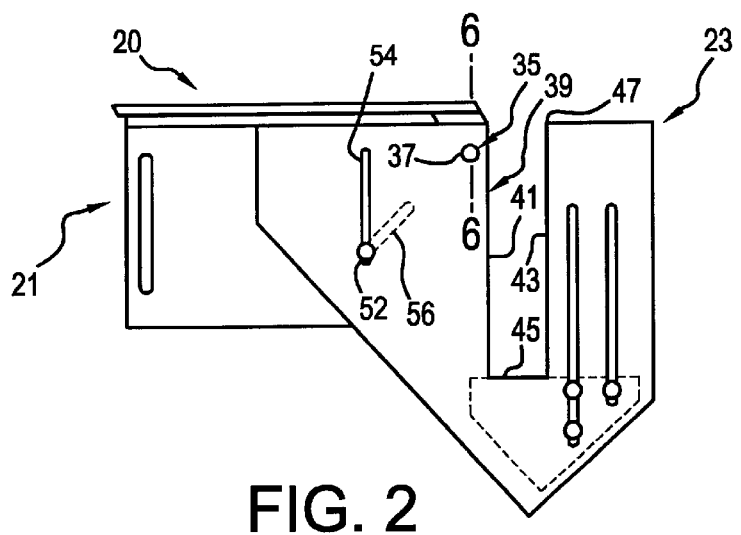
FIG. 1 shows a side view of the inventive tool with the depth adjuster thereof hidden from view behind the support hanger thereof.
Figure 2:
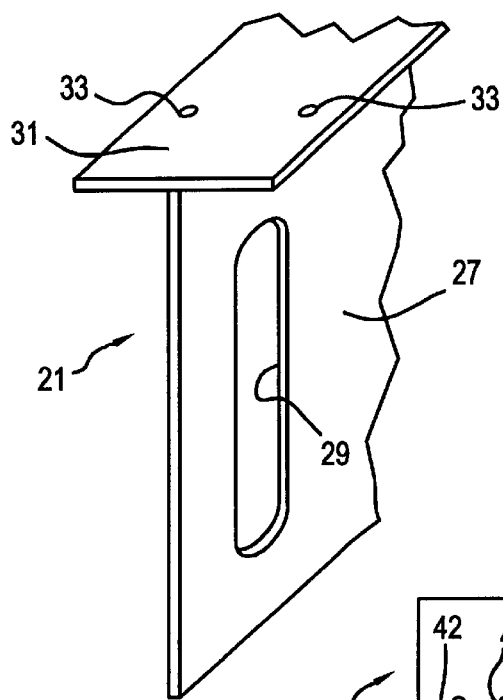
FIG. 2 shows a perspective view of a portion of the t-bar of the inventive tool.
Figure 3:
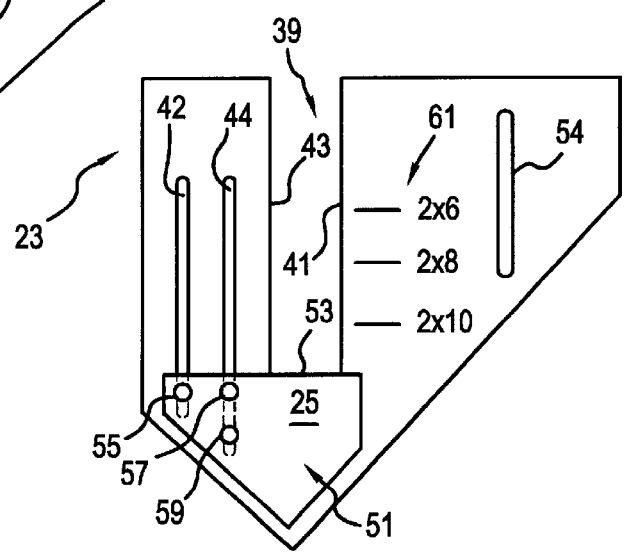
FIG. 3 shows a view of the opposite side of the support hanger from these shown in FIG. 1.

Now, with reference to FIGS. 1–3, further details of the tool 20 will become evident. With reference to FIGS. 1–3, the inventive tool 20 is seen to include a t-bar 21 (FIGS. 1 and 2), a support hanger 23 (FIGS. 1 and 3), and a depth adjuster 25 (FIG. 3). With particular reference to FIG. 2, the t-bar 21 includes a flat elongated member 27 having an elongated opening 29 therethrough comprising a hand grip allowing the user to grip the t-bar and thereby the entire tool 20. With further reference to FIG. 2, a second perpendicular member 31 is mounted across the top surface of the flat elongated member 27 and includes a plurality of openings 33 therethrough for a purpose to be described in greater detail hereinafter.

Figure 6:
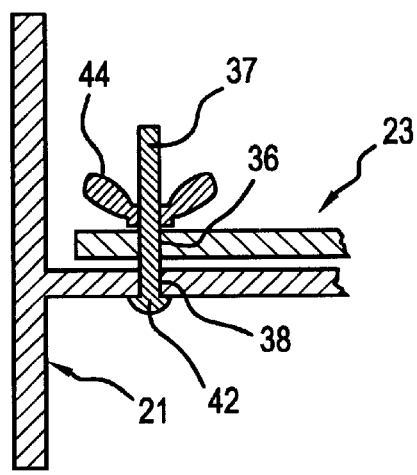
FIG. 6 shows a cross-sectional view along the line 6—6 of FIG. 1.

With reference to FIGS. 1 and 6, the support hanger 23 is pivotably mounted to the t-bar 21 by a pivot 35 consisting of a threaded fastener 37 extending through openings 36 and 38 through the support hanger 23 and t-bar 21, respectively, with the threaded fastener 37 having a head 42 and a wing nut or other fastener 44 that is adapted to tighten and loosen to allow angular adjustment between the support hanger 23 and t-bar 21 and, when tightened, facilitating fixing of that angular relationship therebetween. An additional fastener 52 extends through the slot 54 in support hanger 23 and the slot 56 in t-bar 21 (seen in phantom in FIG. 1), and assists in guiding the pivoting movements of the support hanger 23 with respect to the t-bar 21. The fastener 52 is tightened in the same manner as the fastener 37 to lock the angular relationship between the support hanger 23 and t-bar 21.

The support hanger includes an elongated rectangular slot 39 sized and configured to receive therein a fascia board with the walls 41 and 43 thereof being spaced to slidably receive the typical 2×4, 2×8, 2×10 or 2×12 board. In the preferred embodiment, the distance from the bottom wall 45 of the slot 39 to the opening 47 thereof is equal to the length dimension of a 2×12.

With reference in particular to FIG. 3, the depth adjuster 25 is seen to include a flat body 51 having a top wall 53 for a purpose to be described in greater detail hereinafter.

With reference to FIGS. 1 and 3, the support hanger 23 includes two parallel elongated slots 42 and 44. The depth adjuster 51 includes openings therethrough designated by the reference numerals 55, 57 and 59 with the opening 55 aligned with the slot 42 and with the openings 57 and 59 aligned with the slot 44. Fasteners like that which is illustrated in FIG. 6 extend through the openings 55, 57 and 59, each consisting of a threaded element having a head and a wing nut threadably mounted thereover that may be tightened against a face of the support hanger 23 to fix the position of the depth adjuster 25 with respect to the slot 39. As should be understood from FIG. 3, the relationship between the wall 53 of the depth adjuster 25 and the slot 39 of the support hanger 23 determines the depth of the slot 39 such that a fascia board received within the slot can descend into the slot a prescribed distance depending upon the physical position of the depth adjuster 25 with respect to the support hanger 23.

As should be understood, with particular reference to FIG. 3, the respective lengths of the slots 42 and 44 in the upward direction determines the distance by which the depth adjuster 25 may be moved to adjust the depth of the slot 39. If desired, indicia such as the indicia 61, particularly shown in FIG. 3, may be suitably located on the support hanger 23 so that they may be aligned with the wall 53 of the depth adjuster so that the fasteners (not shown) extending through the openings 55, 57 and 59 may be tightened in an appropriate location depending upon the particular fascia boards that are being employed.

In one preferred method of use of the inventive tool 20, first, the t-bar is placed on the end of a rafter board with the end thereof closest to the support hanger aligned with the end of the rafter board. In that position, duplex nails are driven through the openings 33 in the member 31 to temporarily affix the t-bar 21 to the rafter board, for example, 1, 2 or 3 (FIG. 5).

With reference to FIGS. 4 and 5, the support hanger 23 is rotated with respect to the t-bar 21 until the wall 41 of the slot 39 of the support hanger 23 is aligned with the end of the rafter board, for example, the end 4 as seen in FIG. 5. In that position of alignment, the fastener 37 is tightened to fix the angular relationship between the support hanger 23 and the t-bar 21.

Either before the t-bar 21 is affixed to the rafter board or afterward, but certainly before the fascia board is inserted into the slot 39, the depth adjuster 25 is moved with respect to the slot 39 to adjust the depth of the slot 39 depending upon the dimensions of the fascia board that will be employed. The fasteners (not shown) extending through the openings 55, 57 and 59 are suitably tightened to fix the position of the wall 53 of the depth adjuster 25 with respect to the slot 39 to fix the depth of the slot 39 thereby.

Thereafter, a fascia board such as the fascia board 5 seen in FIGS. 4 and 5 is slidably inserted into the slot 39 and the fascia board 5 is affixed to the ends of the rafter boards using a suitable number of nails.

If desired, a plurality of tools 20 may be simultaneously employed as shown, for example, in FIG. 5, so that the fascia board 5 may easily be aligned in all degrees of freedom for attachment to the ends of the rafter boards, for example, designated by the reference numerals 1, 2 and 3 in FIG. 5.

When the fascia board 5 is nailed to the ends of the rafter boards 1, 2 and 3, the duplex nails may be easily removed from the openings 33 of the member 31 and the tools 20 may easily be removed therefrom, merely by sliding the t-bars 21 laterally until the members 31 are free from the top surfaces 8 of the rafter boards, whereupon the tools 20 may easily be dropped downwardly and out of assembly from the position shown, for example, in FIGS. 4 and 5.

As a clear advantage of the present invention, it should be understood from the figures that with the tools 20 temporarily affixed to the rafter boards, the ends of the rafter boards are not obscured by any structure of the tool 20, whereby nails may be driven through the fascia board 5 and into the ends of the rafters that carry the tools 20. This aspect is a distinct advantage over some of the prior art described hereinabove, wherein the support hanger for the fascia board extends over the end of the rafter board to which it is temporarily affixed, thereby preventing the user from driving nails into that rafter board.

As such, an invention has been disclosed in terms of a preferred embodiment and preferred methods of use that fulfill each and every one of the objects of the invention as set forth hereinabove and provide a tool for hanging fascia board of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A tool for hanging fascia board, comprising:
  a) an elongated T-shaped bar having a flat base having top and bottom edges and a flat lip extending perpendicularly across said top edge and extending to either side thereof, said lip being adapted to engage a top surface of a rafter board to one or another side of said base, said rafter board having a side surface and an end surface;
  b) a support hanger pivotably mounted on said flat base, said support hanger being flat and extending generally parallel to said flat base, said support hanger having an elongated slot having a depth and adapted to receive a fascia board, said elongated slot being solely lateral of said rafter board; and
  c) depth adjustment means for selectively adjusting the depth of said elongated slot.

2. The tool of claim 1, wherein said flat base includes a hand grip consisting of an elongated opening.

3. The tool of claim 1, wherein said support hanger is supported on said flat base via a threaded fastener and a nut threaded thereover, whereby said nut is tightened over said fastener to fix an angular relationship between said support hanger and elongated bar.

4. The tool of claim 1, wherein a side face of said flat base engages a side surface of a rafter board when said lip engages a top surface of a rafter board.

5. The tool of claim 1, wherein said lip includes at least one opening therethrough adapted to receive therethrough a fastener.

6. The tool of claim 5, wherein said at least one opening comprises a plurality of openings.

7. The tool of claim 1, wherein said depth adjustment means comprises a flat plate mounted on said support hanger and having a depth adjusting surface extending across said elongated slot, and flat plate being adjustable on said support hanger to move said depth adjusting surface to any one of a number of spaced positions with respect to said elongated slot.

8. The tool of claim 7, further wherein said depth adjusting surface is linear and said flat plate is movable perpendicular to a depth dimension of said elongated slot.

9. The tool of claim 8, further including indicia on said support hanger alignable with said depth adjusting surface at differing locations to facilitate adjustment of said elongated slot corresponding to depths of standard-sized fascia boards.

10. The tool of claim 7, further including locking means for locking position of said depth adjusting means in any one of a plurality of linearly spaced positions.

11. The tool of claim 7, further wherein said depth adjusting surface is linear and said flat plate is movable perpendicular to a depth dimension of said elongated slot, and further including indicia on said support hanger alignable with said depth adjusting surface at differing locations to facilitate adjustment of said elongated slot corresponding to depths of standard-sized fascia boards.

12. The tool of claim 11, further including locking means for locking position of said depth adjusting means in any one of a plurality of linearly spaced positions.

13. A tool for hanging fascia board, comprising:
  a) an elongated t-bar having a flat base with a top edge and a cross member extending perpendicularly across said top edge, said cross member being adapted to engage a top surface of a rafter board, said rafter board having a side surface and an end surface, a side face of said flat base engaging a side surface of a rafter board when said cross member engages a top surface of a rafter board;
  b) a support hanger pivotably mounted on said flat base via a threaded fastener and a nut threaded thereover, whereby said nut is tightened over said fastener to fix an angular relationship between said support hanger and elongated bar, said support hanger being flat and extending generally parallel to said flat base, said support hanger having an elongated slot having a depth and adapted to receive a fascia board, said elongated slot being lateral of an end surface of a rafter board to which said tool is removably attached; and
  c) depth adjustment means for selectively adjusting the depth of said elongated slot comprising a flat plate mounted on said support hanger and having a depth adjusting surface extending across said elongated slot, said flat plate being adjustable on said support hanger to move said depth adjusting surface to any one of a number of spaced positions with respect to said elongated slot.

14. The tool of claim 13, wherein said flat base includes a hand grip consisting of an elongated opening.

15. A method of mounting a fascia board on ends of spaced rafter boards, each rafter board having a top surface and side surfaces, the method including the steps of:

a) providing a tool for hanging fascia board including:
   i) an elongated bar having a flat base and a lip extending perpendicularly therefrom, said lip being adapted to engage a top surface of a rafter board, said rafter board having a side surface and an end surface;
   ii) a support hanger pivotably mounted on said flat base, said support hanger being flat and extending generally parallel to said flat base, said support hanger having an elongated slot having a depth and adapted to receive a fascia board; and
   iii) depth adjustment means for selectively adjusting the depth of said elongated slot;
b) mounting said tool on a rafter board with said lip engaging a top surface of a rafter board;
c) adjusting angular relationship between said elongated bar and said support hanger;
d) using said depth adjustment means to adjust depth of said elongated slot;
e) placing a fascia board in said elongated slot; and
f) fastening said fascia board on said ends of said spaced fascia boards.

16. The method of claim 15, wherein a plurality of said tools are provided, each attached to a separate rafter board with respective elongated slots aligned to receive a fascia board.

17. A tool for hanging fascia board, comprising:
   a) an elongated T-shaped bar having a flat base having top and bottom edges and a flat lip extending perpendicularly across said top edge and extending to either side thereof, said lip being adapted to engage a top surface of a rafter board to one or another side of said base, said rafter board having a side surface and an end surface; and
   b) a support hanger pivotably mounted on said flat base, said support hanger being flat and extending generally parallel to said flat base, said support hanger having an elongated slot having a depth and adapted to receive a fascia board, said elongated slot being solely lateral of said rafter board.

* * * * *